United States Patent
Kim et al.

(10) Patent No.: US 8,877,362 B2
(45) Date of Patent: Nov. 4, 2014

(54) RECHARGEABLE BATTERY PACK

(75) Inventors: Jae-Won Kim, Yongin-si (KR); Ji-Heon Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 52 days.

(21) Appl. No.: 13/539,758

(22) Filed: Jul. 2, 2012

(65) Prior Publication Data
US 2013/0143084 A1    Jun. 6, 2013

(30) Foreign Application Priority Data

Dec. 2, 2011  (KR) .................... 10-2011-0128333

(51) Int. Cl.
*H01M 10/48*  (2006.01)
*H01M 10/42*  (2006.01)
*H01M 2/30*  (2006.01)
*H01M 10/6553*  (2014.01)
H01M 2/34  (2006.01)
H01M 2/02  (2006.01)

(52) U.S. Cl.
CPC .......... *H01M 10/4257* (2013.01); *H01M 2/348* (2013.01); *Y02E 60/12* (2013.01); *H01M 2200/10* (2013.01); *H01M 2/0207* (2013.01); *H01M 10/486* (2013.01); *H01M 2/30* (2013.01); *H01M 10/5051* (2013.01)
USPC ............. 429/90; 429/100; 429/120; 429/121; 429/122; 429/170; 429/178

(58) Field of Classification Search
CPC .......... H01M 10/4257; H01M 10/486; H01M 2200/10; H01M 2/0207; H01M 2/30; H01M 2/348; H01M 10/5051; Y02E 60/12
USPC ............. 429/90, 100, 120, 121, 122, 170, 178
See application file for complete search history.

(56) References Cited

U.S. PATENT DOCUMENTS

2012/0270074 A1 * 10/2012 Koh ................................. 429/7

FOREIGN PATENT DOCUMENTS

| JP | 2005-044626 | 2/2005 |
| JP | 2005-189080 | 7/2005 |
| JP | 2007-323875 | 12/2007 |

* cited by examiner

*Primary Examiner* — Patrick Ryan
*Assistant Examiner* — Ben Lewis
(74) *Attorney, Agent, or Firm* — Lee & Morse, P.C.

(57) ABSTRACT

A rechargeable battery pack including a cell having an electrode assembly and a pouch for retaining the electrode assembly therein; an electrode tab connected to a lead tab of the cell; and a temperature sensor received in a receiving groove of the electrode tab.

17 Claims, 6 Drawing Sheets

RECHARGEABLE BATTERY PACK

BACKGROUND

1. Field

The described technology relates generally to a rechargeable battery pack.

2. Description of the Related Art

A rechargeable battery may be used as one cell or a plurality of cells that are electrically connected to each other, depending on the type of device. For example, a rechargeable battery pack may include a cell that includes the rechargeable battery and a thermistor that measures the temperature of the cell.

In the rechargeable battery pack, the thermistor is attached to the cell and a voltage is applied to the thermistor. A resistance of the thermistor is changed according to the temperature and an output voltage of the thermistor is changed according to the resistance. As a result, the temperature of the cell is measured through the change of the voltage.

For example, a thermistor of an epoxy resin coating type is used in a rechargeable battery pack of a low capacity cell, and is fixed to the cell by tape or thermal transmission silicon. A thermistor of a surface measuring type is used in a rechargeable battery pack of a large capacity cell, and is fixed to an electrode tab of the cell by a screw.

The thermistor of the surface measuring type receives heat generated in the surface of the cell through a metal terminal of a bonded portion and an epoxy resin enclosing the thermistor. However, the epoxy resin and the metal terminal are exposed to outside air such that the heat of the thermistor bonded portion is emitted. Accordingly, the accuracy of the temperature measured by the thermistor is deteriorated. The accuracy of the temperature measurement may be further decreased with increased temperature.

The above information disclosed in this Background section is only for enhancement of understanding of the background of the described technology and therefore it may contain information that does not form the prior art that is already known in this country to a person of ordinary skill in the art.

SUMMARY

One or more embodiments may provide a rechargeable battery pack, including: a cell including an electrode assembly and a pouch for retaining the electrode assembly therein; an electrode tab connected to a lead tab of the cell; and a temperature sensor received in a receiving groove of the electrode tab. The temperature sensor may include a thermistor. The electrode tab may include a first plate connected to the lead tab and having a first thickness, and a second plate integrally formed with the first plate and having a second thickness that is larger than the first thickness, the receiving groove being in the second plate.

The receiving groove may include inner opposing side surfaces, and a bottom surface between the inner side surfaces. The temperature sensor may include a sensing unit, and a thermal transmission unit at an outer surface of the sensing unit, wherein the thermal transmission unit is adhered to at least one surface of the inner side surfaces and the bottom surface of the receiving groove. The temperature sensor may further include a fixing unit connected to an outer surface of the sensing unit and fixed to the electrode tab by a fastening member. The fixing unit may include a metal material. A heat sink may be attached to at least one surface of the cell.

The rechargeable battery pack may further include a first holder case coupled to one side of the heat sink and insulating and supporting a first surface of the electrode tab, and a second holder case coupled to the first holder case and insulating and covering a second surface of the electrode tab, the second surface opposing the first surface. The lead tab and the electrode tab may be overlapping and may contact each other, the lead tab and the electrode tab being electrically connected to each other. A fastening member may be coupled to the electrode tab, the fastening member extending through the second holder case and the lead tab, the lead tab and the electrode tab maintaining an electrically connected state. The second plate may include an exposed surface, the exposed surface being outside of the first holder case and the second holder case, the first holder case and the second holder case being coupled together to insulate the electrode tab.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
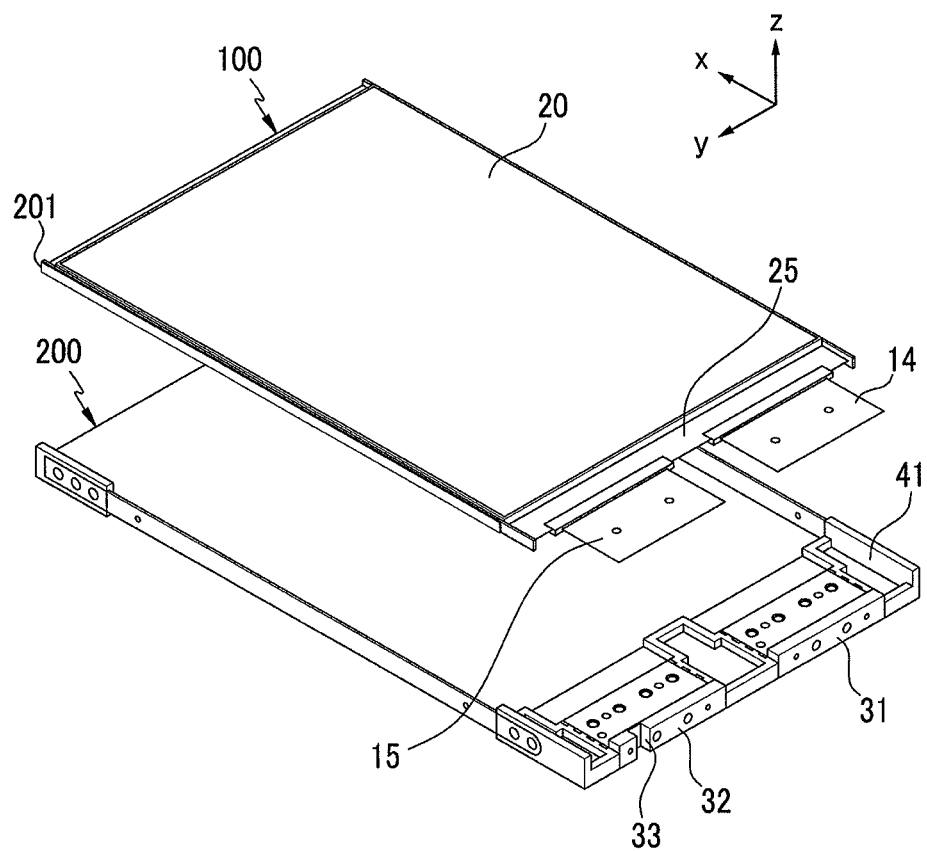
FIG. 1 illustrates a stage of attaching a cell to a heat sink in a method of assembling a rechargeable battery pack, according to an exemplary embodiment.

Korean Patent Application No. 10-2011-0128333, filed on Dec. 2, 2011, in the Korean Intellectual Property Office, and entitled: "Rechargeable Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a stage of attaching a cell to a heat sink in a method of assembling a rechargeable battery pack according to an exemplary embodiment. Referring to FIG. 1, a rechargeable battery pack may include a cell 100 including rechargeable batteries and a heat sink 200 attached to one surface of the cell 100. For example, adjacent horizontal surfaces (lying in a plane within the x and y axes) and vertical surfaces (lying in a plane within x and z axes) of the cell 100 and the heat sink 200 may be attached together by a double-sided adhesive tape (not shown).

Figure 2:
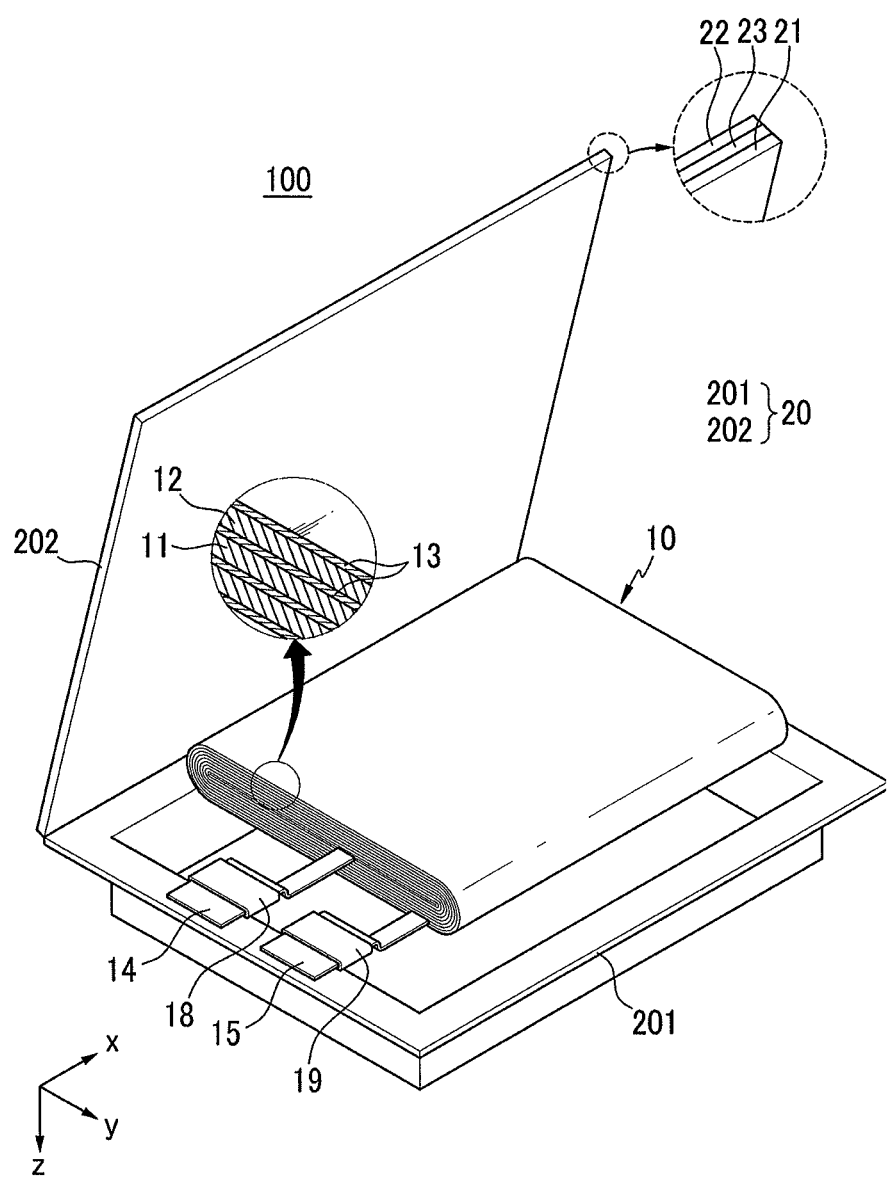
FIG. 2 illustrates a perspective view of the cell of FIG. 1, with the pouch open and the electrode assembly disassembled.

FIG. 2 illustrates a perspective view of the cell of FIG. 1, with the pouch open and the electrode assembly disassembled. Referring to FIG. 2, the electrode assembly 10 may be formed in a jelly roll shape by stacking together a negative electrode 11, a positive electrode 12, and a separator 13. Opposing first and second sides of the negative electrode 11 may be aligned with the respective opposing first and second sides of the positive electrode 12 and the separator 13. The negative electrode 11 and the positive electrode 12 may be disposed on opposing sides of the separator 13. The stack including the negative electrode 11, the positive electrode 12, and the separator 13 may be spiral-wound. The separator 13 may include a polymer solid electrolyte film through which lithium ions may pass.

The electrode assembly may be formed by depositing the negative electrode and the positive electrode (made of a single plate) via the separator disposed therebetween (not shown). Also, the negative electrode, the separator, and the positive electrode may be formed with a deposition structure by folding them in a zigzag manner (not shown).

Figure 3:
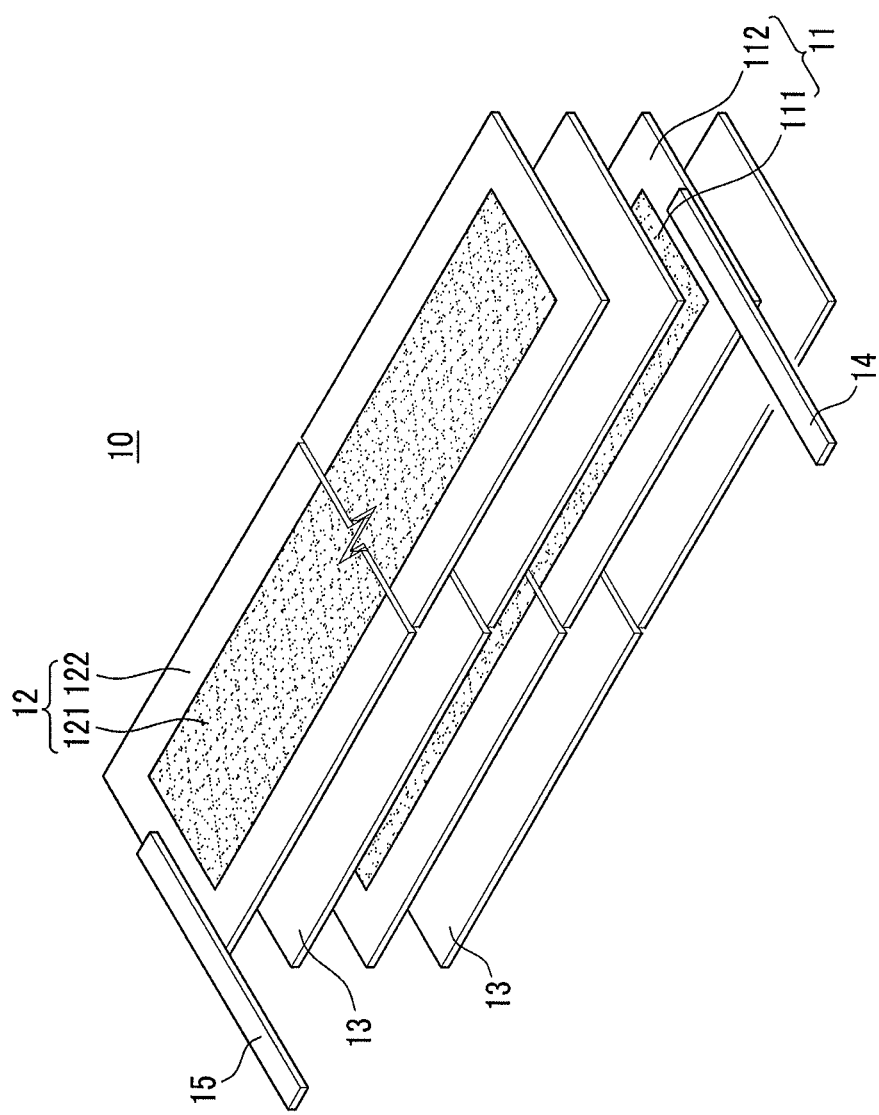
FIG. 3 illustrates an exploded perspective view of the electrode assembly of FIG. 2.

FIG. 3 illustrates an exploded perspective view of the electrode assembly of FIG. 2. Referring to FIG. 3, the negative electrode 11 may include a coated region 111 and an uncoated region 112. The coated region 111 may include a portion of a current collector that is coated with an active material, and the uncoated region 112 may include a portion of the current collector that is exposed, e.g., not coated with the active material. The current collector may include a metal plate. A negative electrode lead tab 14 may be connected with the uncoated region 112 of the negative electrode 11.

The positive electrode 12 may include a coated region 121 and an uncoated region 122. The coated region 121 may include a portion of a current collector that is coated with an active material different from that of the negative electrode 11. The uncoated region 122 may include a portion of the current collector that is exposed, e.g., not coated with the active material. The current collector may include a metal plate. A positive electrode lead tab 15 may be connected to the uncoated region 122 of the positive electrode 12. The positive electrode lead tab 15 may extend from the first side of the positive electrode 12, and the negative electrode lead tab 14 may extend from the second side of the negative electrode 11.

Again referring to FIG. 2, a pouch 20 may include a first exterior unit 201, which receives the electrode assembly 10, and a second exterior unit 202, which covers the electrode assembly 10. Once the second exterior unit 202 covers the electrode assembly 10, the second exterior unit 202 may be thermally adhered to the first exterior unit 201.

According to some embodiments, the first exterior unit 201 may have a concave structure to facilitate receiving the electrode assembly 10 therein. For example, the first exterior unit 201 may include a cavity in which the electrode assembly 10 may be disposed. The second exterior unit 202 may be flat to cover the electrode assembly 10 received in the first exterior unit 201. The electrode assembly 10 may have a cuboid, flat structure. Accordingly, the pouch 20 may have a cuboid, flat structure to accommodate the electrode assembly 10. The pouch 20 may surround the electrode assembly 10. Therefore, the rechargeable battery itself may be a cuboid, flat structure.

The first and second exterior units 201 and 202 may be integrally formed, and may include multiple layers. For example, the first and second exterior units 201 and 202 may each include a polymer sheet 21, a nylon sheet 22, and a metal sheet 23.

The polymer sheet 21 may form an inner surface of the pouch 20 and may function as an insulator. Heat fusion bonding may be used to bond together the polymer sheet 21, the nylon sheet 22, and the metal sheet 23. The nylon sheet 22 may form the outer surface of the pouch 20 to protect the electrode assembly 10. The nylon sheet 22 may include a PET (polyethylene terephthalate) sheet or a PET—nylon composition sheet. The metal sheet 23 may provide mechanical integrity to the pouch 20. The metal sheet 23 may be interposed between the polymer sheet 21 and the nylon sheet 22, and may include an aluminum sheet, for example. The nylon sheet 22 coupled to the metal sheet 23, may be attached to the heat sink 200 to transmit heat generated in the cell 100 to the heat sink 200.

Again referring to FIG. 1 and FIG. 2, the negative electrode lead tab 14 and the positive electrode lead tab 15 may extend outside of the thermally adhered pouch 20, to facilitate electrically connecting the electrode assembly 10 to components outside of the pouch 20.

According to some embodiments, the negative electrode lead tab 14 and the positive electrode lead tab 15 may be between the first and second exterior units 201 and 202, and extend past the first and second exterior units 201 and 202. The negative electrode lead tab 14 and the positive electrode lead tab 15 may be thermally adhered to a terrace unit 25. The terrace unit 25 may extend from a side of the pouch 20, and may lie in a plane within the y-z axis. The negative electrode lead tab 14 and the positive electrode lead tab 15 may be electrically insulated from the pouch 20 by insulating members 18 and 19 (FIG. 2). The insulating members 18 and 19, respectively, may extend around at least a portion of the negative electrode lead tab 14 and the positive electrode lead tab 15.

The terrace unit 25 may be formed by thermally adhering an end, e.g., edge, of the first exterior unit 201 to a corresponding surface of the second exterior unit 202. For example, the first exterior unit 201 may have a bent edge that extends from a side of the pouch that is the same as a side from which the negative electrode lead tab 14 and the positive electrode lead tab 15 extend. The bent side edge of the first exterior unit 201 may be adhered to a lower, flat surface of the second exterior unit, to form the terrace unit 25. The negative electrode lead tab 14 and the positive electrode lead tab 15 may extend past the terrace unit 25.

Figure 4:
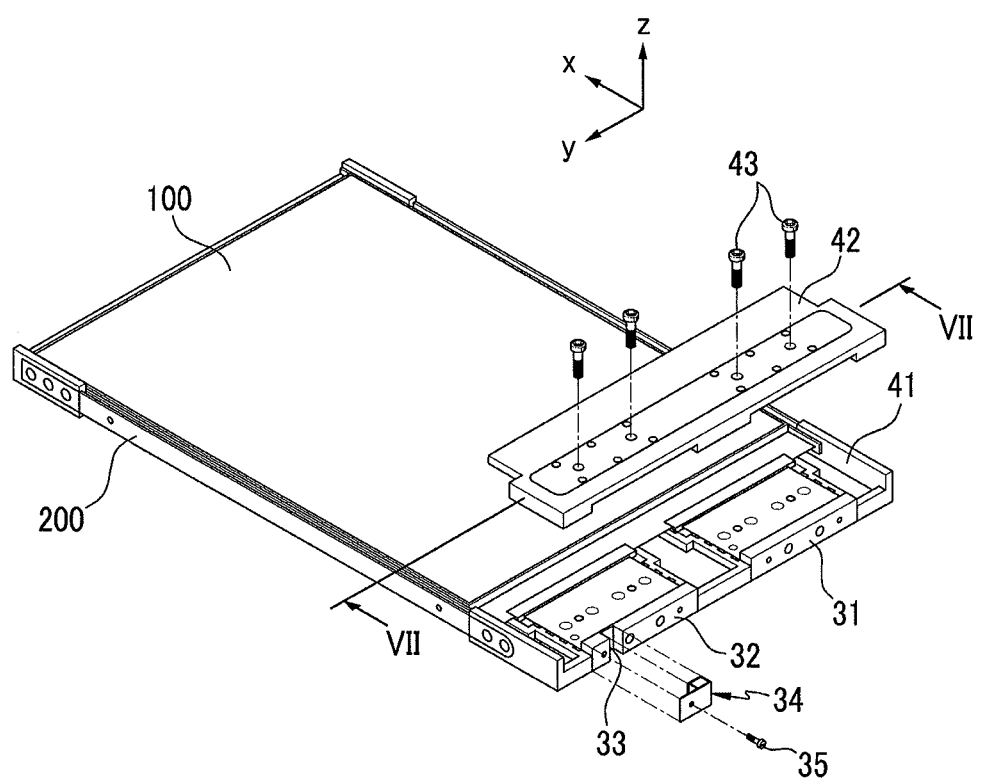
FIG. 4 illustrates a stage of assembling a thermistor to an electrode tab and assembling a holder case to a cell in a method of assembling a rechargeable battery pack according to an exemplary embodiment.

FIG. 4 illustrates a stage of assembling a thermistor to an electrode tab and assembling a holder case to a cell in a method of assembling a rechargeable battery pack according to an exemplary embodiment.

Referring to FIG. 1 and FIG. 4, a rechargeable battery pack according to an exemplary embodiment may include electrode tabs respectively corresponding and connected to the negative and positive electrode lead tabs 14 and 15. For example, the rechargeable battery pack may include a negative electrode tab 31, a positive electrode tab 32, a first holder case 41, and a second holder case 42. The first holder case 41 and the second holder case 42 may provide an insulating structure for the negative and positive electrode tabs 31 and 32. The first holder case 41 and the second holder case 42 may support and cover the negative and positive electrode tabs 31 and 32.

Figure 7:
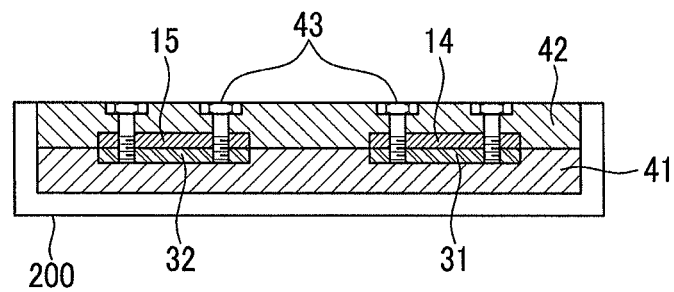
FIG. 7 illustrates a cross-sectional view taken along the line VII-VII of FIG. 4.

For example, the first and second holder cases 41 and 42 may be symmetrical structures that are configured to engage each other. The first and second holder cases 41 and 42 may include a resin composition. The first and second holder cases 41 and 42 may be overlapping and may receive the negative and positive electrode tabs 31 and 32 therebetween. For example, a portion of the negative and positive electrode tabs 31 and 32 that extends past the terrace unit 25 may be disposed within first and second holder cases 41 and 42. When the negative and positive electrode lead tabs 14 and 15 are positioned within the first and second holder cases 41 and 42, the negative and positive electrode lead tabs 14 and 15 may respectively overlap the negative and positive electrode tabs 31 and 32 and maintain electrical connectivity therewith (FIG. 4 and FIG. 7).

The first holder case 41 may correspond in position to the negative and positive electrode tabs 31 and 32. Accordingly, the first holder case 41 may be coupled to one side of the heat sink 200 and receive a surface, e.g., a bottom surface, of the negative and positive electrode tabs 31 and 32. The first holder case 41 may provide an insulating structure for the negative and positive electrode tabs 31 and 32. The first holder case 41 may support the negative and positive electrode tabs 31 and 32. The first holder case 41 may be assembled with the heat sink 200, before the cell 100 is assembled with the heat sink 200.

The second holder case 42 may be coupled to the first holder case 41 and may receive, e.g., overlie, a second surface, e.g., an upper surface, of the negative and positive electrode tabs 31 and 32 that is overlapped with the negative and positive electrode lead tabs 14 and 15. The second holder case 42 may thereby provide an insulating structure for the negative and positive electrode lead tabs 14 and 15 and the negative and positive electrode tabs 31 and 32. The second holder case 42 may simultaneously cover both the negative and positive electrode lead tabs 14 and 15 and the negative and positive electrode tabs 31 and 32.

A fastening member 43, e.g., a screw, may extend through the second holder case 42, the negative and positive electrode lead tabs 14 and 15, and the negative and positive electrode tabs 31 and 32. The fastening member 43 may couple the second holder case 42 with the negative and positive electrode tabs 31 and 32. A fastening force of the fastening member 43 may facilitate firmly maintaining the negative and positive electrode lead tabs 14 and 15 and the negative and positive electrode tabs 31 and 32 in an electrically connected state.

Referring to FIG. 7, the second holder case 42 may be coupled to the first holder case 41. The first holder case 41 may be fixed to, e.g., secured within, the heat sink 200. The first and second holder cases 41 and 42 may receive the negative and positive electrode tabs 31 and 32 at the side of the terrace unit 25 of the cell 100.

Referring to FIG. 1 and FIG. 4, an exemplary embodiment of the rechargeable battery pack may include a receiving groove 33 defined within one of the negative and positive electrode tabs 31 and 32. A temperature sensor 34 may be disposed within the receiving groove 33.

According to an implementation, the receiving groove 33 and the temperature sensor 34 may be in the positive electrode tab 32. The receiving groove 33 and the temperature sensor 34 may facilitate determining a temperature of the cell 100 by sensing and measuring a temperature of the positive electrode tab 32. For example, a resistance of the temperature sensor 34 may be changed according to a temperature change. Accordingly, the temperature sensor 34 may be a thermistor that changes an output voltage.

Figure 5:
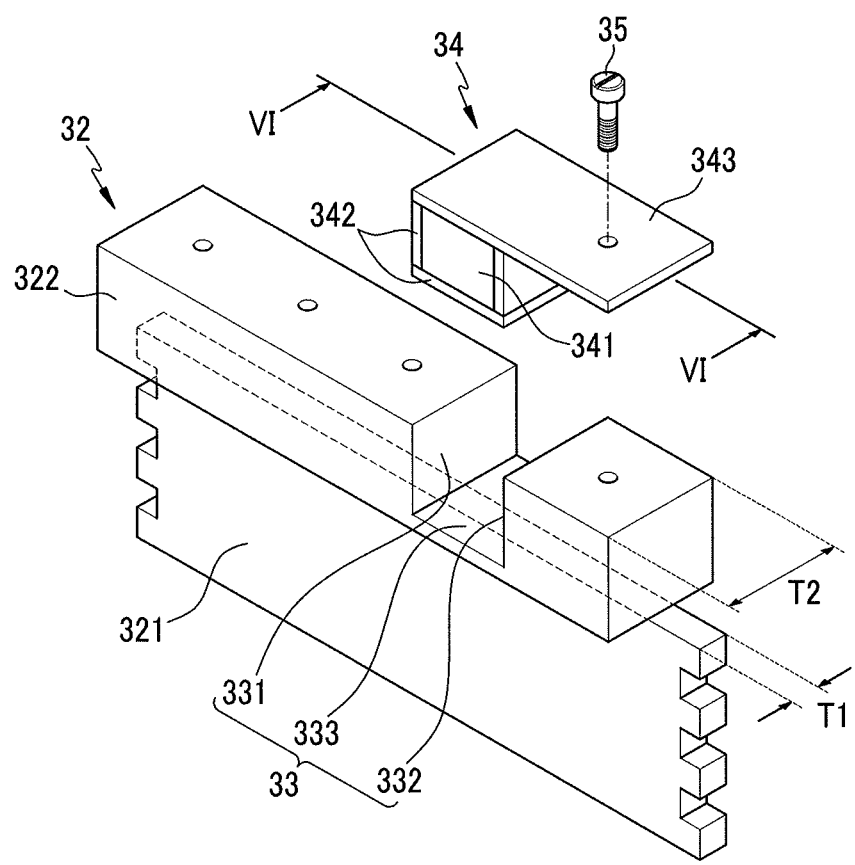
FIG. 5 illustrates an exploded perspective view of the electrode tab and the thermistor of FIG. 1.
Figure 6:
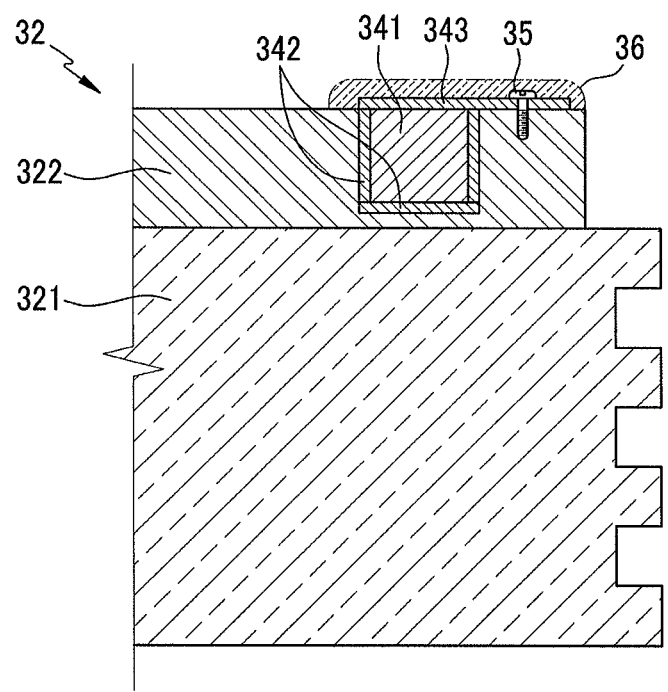
FIG. 6 illustrates a cross-sectional view taken along the line VI-VI of FIG. 5.

FIG. 5 illustrates an exploded perspective view of the electrode tab and the thermistor of FIG. 1. FIG. 6 illustrates a cross-sectional view taken along the line VI-VI of FIG. 5.

Referring to FIG. 5 and FIG. 6, the positive electrode tab 32 may include a first plate 321 and a second plate 322 that are integrally formed. The first plate 321 may be connected to the positive electrode lead tab 15 and may have a first thickness T1. The second plate 322 has a second thickness T2 that is larger than the first thickness T1.

The receiving groove 33 may be formed in the second plate 322 and may be exposed to an exterior of the first and second holder cases 41 and 42. For example, the receiving groove 33 may have inner side surfaces 331 and 332 of the second plate 322, which face each other, and a bottom surface 333 between the inner side surfaces 331 and 332.

The receiving groove 33 may provide a space for receiving the temperature sensor 34, thereby forming a receiving space for heat transmitted to and emitted from the second plate 322. Also, the receiving groove 33 may extend direction of the thickness T2. In this case, both sides of the passing direction of the receiving groove 33 may be closed by the first and second holder cases 41 and 42 such that the receiving groove 33 has an opening at only one side, thereby effectively receiving the heat inside.

The temperature sensor 34 may include a sensing unit 341 for sensing heat and a thermal transmission unit 342 provided at an outer surface of the sensing unit 341. The thermal transmission unit 342 may be adhered to at least one surface among the inner side surfaces 331 and 332 and the bottom surface 333 of the receiving groove 33 to facilitate transmission of heat transmitted to the second plate 322 to the sensing unit 341.

The thermal transmission unit 342 may be formed of metal material at three surfaces of the sensing unit 341, e.g., surfaces in contact with the receiving groove 33, such that the heat transmitted from three surfaces of the receiving groove 33, e.g., inner side surfaces 331 and 332, and bottom surface 333, may be transmitted to the sensing unit 341. Accordingly, the measuring accuracy of the temperature may be increased. The thermal transmission to the sensing unit 341 from the thermal transmission unit 342 may be efficiently performed such that the measuring accuracy of the temperature may be further increased.

Also, the temperature sensor 34 may further include a fixing unit 343 connected to one outer surface of the sensing unit 341. The fixing unit 343 may be fixed to the second plate 322 of the positive electrode tab 32 by a fastening member 35.

The fixing unit 343 may be formed of a metal material, to facilitate heat transmission from the outer surface of the second plate 322 to the sensing unit 341 in the positive electrode tab 32. Accordingly, a temperature of the positive electrode tab 32 may be more accurately measured.

A sealing material 36 may cover the sensing unit 341 and the fixing unit 343 to facilitate blocking heat emitted between the fixing unit 343, the sensing unit 341, and the receiving groove 33, and thereby allow more accurate measurement of temperature.

As described above, the rechargeable battery pack according to an exemplary embodiment may include the temperature sensor at the receiving groove of the electrode tab to facilitate sensing most of the heat that is transmitted from the electrode tab, without being influenced by external air. A temperature of the cell may, thereby, be more accurately measured. Also, thermal emission may be largely reduced in a high temperature range, which may further facilitate accurate measurement of the cell temperature.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery pack, comprising:
   a cell including an electrode assembly and a pouch for retaining the electrode assembly therein;
   an electrode tab connected to a lead tab of the cell;
   a first holder case supporting the electrode tab and the lead tab;
   a second holder case overlying the electrode tab and the lead tab, wherein the first and second holder cases are coupled together to insulate the electrode tab; and
   a temperature sensor received in a receiving groove of the electrode tab.

2. The rechargeable battery pack as claimed in claim 1, wherein the temperature sensor includes a thermistor.

3. The rechargeable battery pack as claimed in claim 1, wherein the electrode tab includes:
   a first plate connected to the lead tab and having a first thickness, and
   a second plate integrally formed with the first plate and having a second thickness that is larger than the first thickness, the receiving groove being in the second plate.

4. The rechargeable battery pack as claimed in claim 3, wherein the receiving groove includes inner opposing side surfaces and a bottom surface between the inner side surfaces.

5. The rechargeable battery pack as claimed in claim 4, wherein the temperature sensor includes a sensing unit and a thermal transmission unit at an outer surface of the sensing unit, the thermal transmission unit being adhered to at least one surface of the inner side surfaces and to the bottom surface of the receiving groove.

6. The rechargeable battery pack as claimed in claim 5, wherein the temperature sensor further includes a fixing unit, the fixing unit being connected to the outer surface of the sensing unit and fixed to the electrode tab by a fastening member.

7. The rechargeable battery pack as claimed in claim 6, wherein the fixing unit includes a metal material.

8. The rechargeable battery pack as claimed in claim 3, wherein the second plate includes an exposed surface, the exposed surface being outside of the first holder case and the second holder case.

9. The rechargeable battery pack as claimed in claim 8, wherein:
   the receiving groove is defined by first and second opposing inner side surfaces of the second plate and a bottom surface of the second plate between the first and second inner side surfaces, and
   first and second holder cases cover first and second opposing exposed sides of the receiving groove, respectively, such that the receiving groove has an opening at only one side, the opening being in the exposed surface of the second plate, opposite to the bottom surface of the second plate.

10. The rechargeable battery pack as claimed in claim 9, wherein the temperature sensor is configured to sense heat that is transmitted from the electrode tab without being substantially influenced by external air.

11. The rechargeable battery pack as claimed in claim 1, further comprising a heat sink attached to at least one surface of the cell.

12. The rechargeable battery pack as claimed in claim 11, wherein:
   the first holder case is coupled to one side of the heat sink, the first holder case insulating and supporting a first surface of the electrode tab, and
   the second holder is case coupled to the first holder case, the second holder case insulating and covering a second surface of the electrode tab, the second surface of the electrode tab opposing the first surface of the electrode tab.

13. The rechargeable battery pack as claimed in claim 12, wherein the lead tab and the electrode tab are overlapping and contact each other, the lead tab and the electrode tab being electrically connected to each other.

14. The rechargeable battery pack as claimed in claim 13, wherein a fastening member is coupled to the electrode tab, the fastening member extending through the second holder case and the lead tab, the lead tab and the electrode tab maintaining an electrically connected state.

15. A rechargeable battery pack, comprising:
   a cell including an electrode assembly and a pouch for retaining the electrode assembly therein;
   an electrode tab connected to a lead tab of the cell, the electrode tab including a first plate connected to the lead tab and having a first thickness, and a second plate integrally formed with the first plate and having a second thickness that is larger than the first thickness; and
   a temperature sensor received in a receiving groove of the electrode tab,
   wherein:
      the receiving groove is in the second plate of the electrode tab, and includes inner opposing side surfaces and a bottom surface between the inner side surfaces, and
      the temperature sensor includes a sensing unit, a thermal transmission unit at an outer surface of the sensing unit, and a fixing unit, the fixing unit being connected to the outer surface of the sensing unit and fixed to the electrode tab by a fastening member, and the thermal transmission unit being adhered to at least one surface of the inner side surfaces and the bottom surface of the receiving groove.

16. The rechargeable battery pack as claimed in claim 15, wherein the fixing unit includes a metal material.

17. A rechargeable battery pack, comprising:
   a cell including an electrode assembly and a pouch for retaining the electrode assembly therein;
   a heat sink attached to at least one surface of the cell;
   an electrode tab electrically connected to a lead tab of the cell, wherein the lead tab and the electrode tab are overlapping and contact each other;
   a first holder case coupled to one side of the heat sink and insulating and supporting a first surface of the electrode tab;

a second holder case coupled to the first holder case and insulating and covering a second surface of the electrode tab, the second surface opposing the first surface;

a fastening member coupled to the electrode tab, the fastening member extending through the second holder case and the lead tab, the lead tab and the electrode tab maintaining an electrically connected state; and a temperature sensor received in a receiving groove of the electrode tab.

* * * * *